United States Patent [19]

Kanazawa et al.

[11] 4,368,572
[45] Jan. 18, 1983

[54] METHOD OF MANUFACTURING A SHAFT STRUCTURE HAVING A SPHERICAL BULB

[75] Inventors: Hirotaka Kanazawa; Yoshikazu Yasuda; Kozo Harada; Susumu Yoshida, all of Hiroshima, Japan

[73] Assignees: Toyo Kogyo Co., Ltd.; Delta Kogyo Co., Ltd., both of Hiroshima, Japan

[21] Appl. No.: 197,197

[22] Filed: Oct. 15, 1980

[30] Foreign Application Priority Data

Oct. 15, 1979 [JP] Japan .............................. 54-134612
May 24, 1980 [JP] Japan ............................ 55-71702[U]
May 30, 1980 [JP] Japan ................................ 55-73275
Jun. 2, 1980 [JP] Japan ............................ 55-76870[U]

[51] Int. Cl.³ ............................................. B23P 11/00
[52] U.S. Cl. .................................. 29/432; 29/455 R; 29/520; 403/282; 403/285; 384/206
[58] Field of Search .................... 29/520, 432, 455 R; 403/282, 283, 285, 122, 127; 464/147, 150; 308/71, 30

[56] References Cited

U.S. PATENT DOCUMENTS

| 1,816,151 | 7/1931 | Howsam et al. | 29/520 UX |
| 2,165,379 | 7/1939 | Hiers | 29/520 UX |
| 2,710,677 | 6/1955 | Ferris | 29/455 R UX |
| 2,891,826 | 6/1959 | Josephson et al. | 308/72 |
| 3,130,993 | 4/1964 | McCleary | 29/520 UX |
| 3,470,720 | 10/1969 | Eklund et al. | 29/148.4 B X |
| 3,583,060 | 6/1971 | Sigmans | 29/517 X |
| 3,819,150 | 6/1974 | Kajrup | 29/520 X |

Primary Examiner—Charlie T. Moon
Attorney, Agent, or Firm—Fleit & Jacobson

[57] ABSTRACT

A shaft structure comprising a shaft and a hollow spherical shell having diametrically aligned holes which are of a diameter smaller than the outer diameter of the shaft. The shell is secured to the shaft at the aligned holes by radially deforming the shaft. The method for manufacturing the shaft structure includes steps of forming the shell from a tubular blank by swaging the blank so that the opposite ends of the blank bite into the shaft to secure it firmly to the shaft.

3 Claims, 15 Drawing Figures

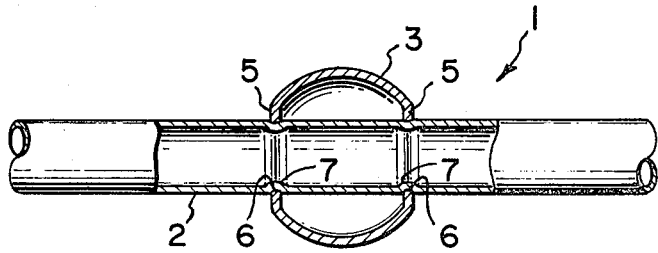
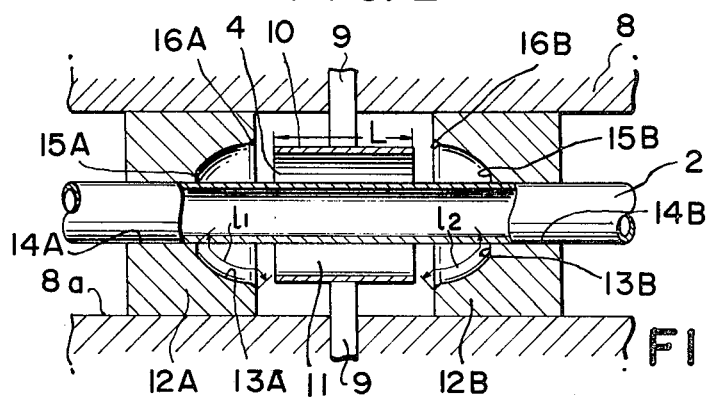
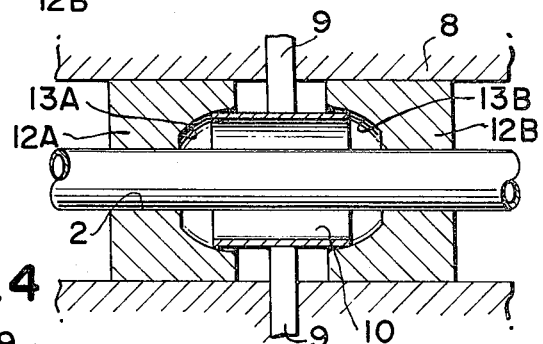
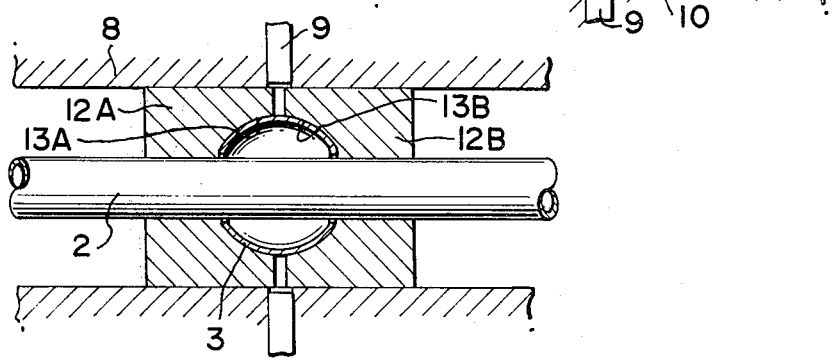

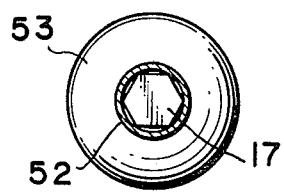
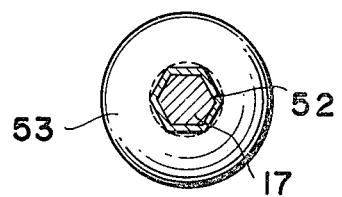
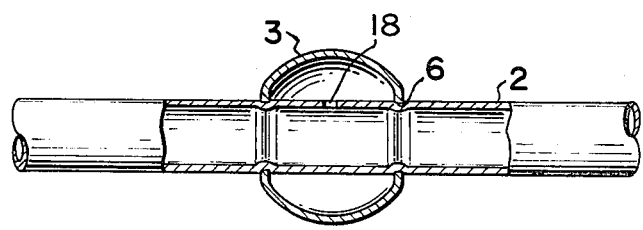
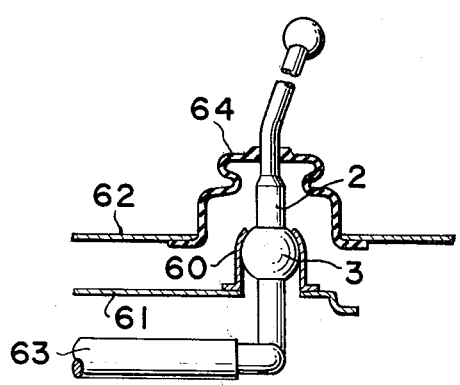
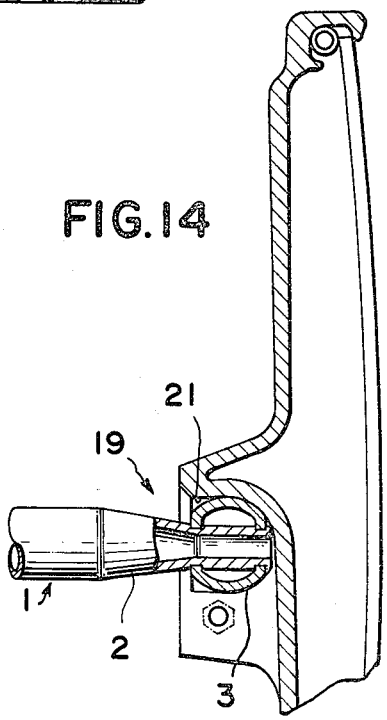

METHOD OF MANUFACTURING A SHAFT STRUCTURE HAVING A SPHERICAL BULB

The present invention relates to a shaft having a spherical bulb and a method for manufacturing the same.

Shafts having spherical bulbs have been widely used in automobile industry as for example transmission gear shifting levers and mirror supporting struts. Conventionally, such shafts have been manufactured by forging processes which are followed by machining processes to form the bulb portions. The conventional methods are however considered disadvantageous in that there is a substantial material loss. Further, the forging and machining processes require a lot of labour so that there have been problems of increased manufacturing costs.

In order to eliminate the above problems, there has been proposed by Japanese patent publication 53-33309 which has been published for opposition on Sept. 13, 1978 to provide a spherical bulb on a shaft by means of a die forming process. According to the proposal, a substantially tubular blank material is at first attached to the shaft by welding and the blank material is then formed into a spherical configuration by a pair of cooperating dies. The proposed process is however still disadvantageous in that the blank material cannot be of a simple tubular configuration but it must be provided with a connecting piece which is adapted to be welded to the shaft. Further, the welding itself is a time-consuming and expensive process.

It is therefore an object of the present invention to provide a shaft having a spherical bulb which can be easily and inexpensively manufactured.

Another object of the present invention is to provide a novel method for manufacturing a shaft having a spherical bulb.

A further object of the present invention is to provide a shaft having a spherical bulb which firmly secured to the shaft.

Still further object of the present invention is to provide a hollow shaft having a spherical bulb fitted thereto by means of swaging, said hollow shaft being reinforced at the swaged portion.

Yet further object of the present invention is to provide a shaft having a spherical bulb secured thereto with means for preventing air or oil from being splashed from the bulb even when the pressure in the bulb is increased due for example to an increase in temperature.

According to the present invention, the above and other objects can be accomplished by a shaft structure comprising a shaft having an outer diameter and a hollow spherical shell having diametrically aligned holes which are of a diameter smaller than the outer diameter of the shaft, said shell being secured to the shaft at the aligned holes by radially deforming the shaft.

According to another feature of the present invention, there is provided a method for manufacturing a shaft structure comprising a shaft having a spherical bulb secured to the shaft, said method comprising steps of providing a hollow cylindrical blank, inserting the shaft through the blank, and forming the blank into a substantially spherical bulb simultaneously swaging the blank around the shaft so that the shaft is locally deformed by edges of the blank and the edges of the blank bite into the shaft to thereby secure the spherical bulb firmly to the shaft.

The above and other objects and features of the present invention will become apparent from the following description of preferred embodiments taking reference to the accompanying drawings, in which:

FIG. 1 is a longitudinal sectional view of a hollow shaft having a spherical bulb made in accordance with the present invention;

FIGS. 2 through 5 are sectional views showing steps of forming a spherical bulb on a hollow shaft in accordance with one embodiment of the present invention;

FIG. 11 is a sectional view taken substantially along the line XI—XI in FIG. 10;

FIG. 12 is a sectional view taken substantially along the line XII—XII in FIG. 10;

FIG. 13 is a longitudinal sectional view of the shaft structure in accordance with a further embodiment of the present invention;

FIG. 14 is a sectional view showing the shaft structure in accordance with one embodiment of the present invention is applied to a mirror support; and, FIG. 15 is a sectional view of a transmission gear shifting lever arrangement to which the shaft structure of the present invention can be applied.

Figure 5:
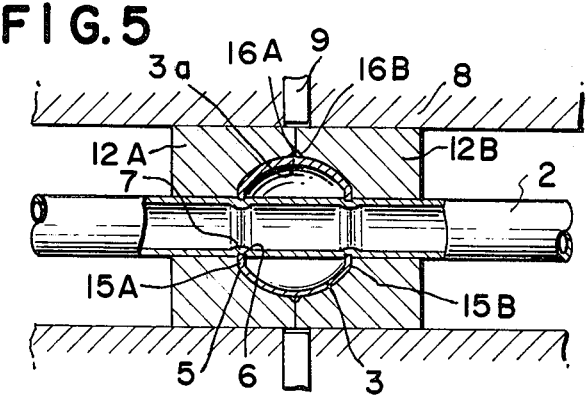

Referring now to the drawings, particularly to FIG. 1, there is shown a shaft structure 1 in accordance with one embodiment of the present invention. The shaft structure 1 comprises a hollow shaft 2 and a spherical bulb 3 attached thereto. The bulb 3 has diametrically aligned holes 6 for passing the shaft 2 therethrough. The holes 6 are however of diameter which is smaller than that of the outer diameter of the shaft 2 so that the shaft 2 is radially inwardly deformed by the edges of the holes 6. Thus, the edges of the holes 6 bite into the shaft 2 to thereby firmly hold the bulb 3 on the shaft 2. In the embodiment shown in FIG. 1, the holes 6 are formed in a pair of diametrically opposed flat surfaces 5.

Referring to FIGS. 2 through 5, there are shown sequential steps of the method for manufacturing the shaft structure 1. In the method, use is made of an apparatus including a guide housing 8 having a cylindrical guide bore 8a and a pair of forming dies 12A and 12B. The guide housing 8 is provided with a plurality of radially extendible holding pins 9 which may be actuated by any suitable actuating device between extended positions as shown in FIG. 5 and retracted positions wherein the pins 9 are completely retracted from the guide bore 8a. The dies 12A and 12B respectively have substantially semi-spherical die cavities 13A and 13B and axial through-holes 14A and 14B for passing the shaft 2 therethrough.

In manufacture, the shaft 2 is placed coaxially in the guide bore 8a by passing it through the holes 14A and 14B in the forming dies 12A and 12B. Prior to this procedure, a tubular blank 10 is placed around the shaft 2. The tubular blank 10 is held in the guide bore 8a between the dies 12A and 12B by the holding pins 9. The blank 10 has a length L which is larger than the sum of the surface lengths $l_1$ and $l_2$ of the die cavities 13A and 13B. The pins 9 hold the tubular blank 10 coaxially with the shaft 2 with an annular space 11 therebetween. The dies 12A and 12B are advanced from the positions shown in FIG. 2 toward each other to the positions shown in FIG. 3 wherein the opposite ends of the tubular blank 10 are received by the die cavities 13A and 13B so that the blank 10 can be held by the dies 12A and 12B. The holding pins 9 are then retracted and the dies 12A and 12B are further advanced toward each other to the positions shown in FIG. 4. In this step, the tubular blank 10 is formed by the die cavities into a substantially spherical configuration.

As the dies 12A and 12B are further advanced, the opposite edges of the blank 10 are forced toward the shaft 2. Since the die cavities 13A and 13B are formed at the bottom portions thereof with flat surfaces 15A and 15B, corresponding flat surfaces 5 are formed around diametrically aligned holes 6 which are defined by the axially opposite ends of the tubular blank 10. The edges defining the holes 6 are forced by the dies radially inwardly into the shaft 2 so that the outer surface of the shaft 2 is deformed as shown by the reference 7 in FIG. 5. Thus, the edges of the holes 6 bite into the shaft 2 to thereby secure the bulb 3 firmly to the shaft 2.

The dies 12A and 12B are formed at the edges of the die cavities 13A and 13B with chamfers 16A and 16B which serve to prevent any flush or burr which may otherwise be formed around the bulb at a portion corresponding to the mating surfaces of the dies 12A and 12B. However, such chamfers 16A and 16B are not essential because such flush or burr can be removed afterwards. Alternatively, the cavities 13A and 13B may have flattened areas around the edges thereof to form a flat band around the bulb so that the flush or burr that may be produced at the mating surfaces of the dies 12A and 12B be within the contour of the sphere of the bulb.

In the illustrated embodiment, the flat surfaces 15A and 15B are effective to prevent wrinkling in the opposite end portions of the bulb 3. By providing the flat surfaces 15A and 15B, the blank 10 is positively forced to slide along the walls of the die cavities so that it becomes possible to prevent wrinkling and increase the accuracy of configuration of the bulb. Without such flat surfaces, there may be possibilities that the bulb be wrinkled around the holes 6 and sometimes depressions may be produced. However, in some applications wherein such wrinkles may be allowed, such flat surfaces may not be provided. In such instances, the bulb 23 may be of true spherical configurations with diametrically aligned holes 26 for passing the shaft 22 therethrough. As in the previous embodiment, the edges of the holes 26 deform the shaft 22 as shown by the reference 27 in FIG. 6.

Figure 6:
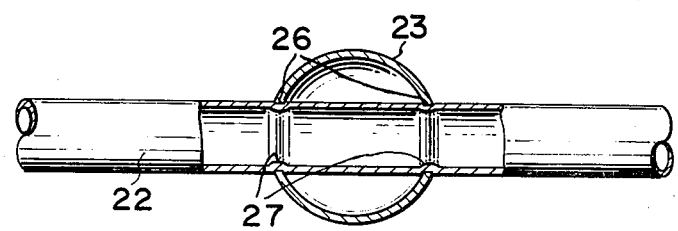
FIG. 6 is a sectional view similar to FIG. 1 but showing another embodiment of the shaft structure in accordance with the present invention.
Figure 7:
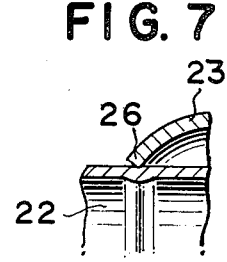
FIGS. 7 and 8 are fragmentary sectional views respectively showing further embodiments.
Figure 8:
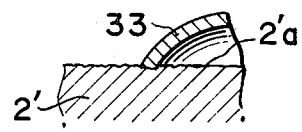

In the embodiments shown in FIGS. 1 and 6, the edges of the holes in the bulb are embedded in the shaft 22 throughout the thickness thereof. However, only corner portions of the edges of the holes may bite into the shaft as shown in FIG. 7. In case where the shaft is of a solid structure as shown by the reference 32 in FIG. 8, the surface of the shaft 32 may be serrated or subjected to a similar treatment so that the edges of the holes 36 of the bulb 33 can readily bite into the shaft 32.

Figure 9:
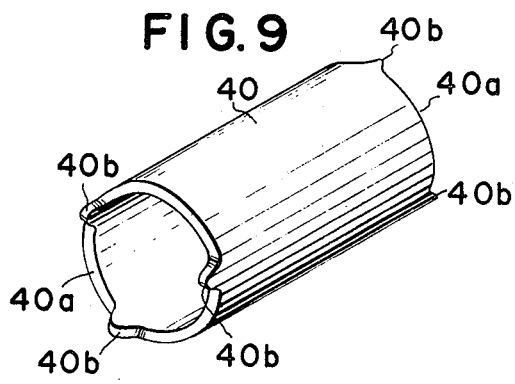
FIG. 9 is a perspective view showing a further example of the hollow cylindrical blank which can be used in the method of the present invention.

FIG. 9 shows another example of the tubular blank for use in forming the bulb in the method of the present invention. As shown, the blank 40 is formed at each axial end 40a with a plurality of axial projections 40b which are adapted to bite into the shaft. In the illustrated embodiment, the projections 40b in the opposite ends 40a are in circumferentially staggered relationship with each other. The projections may be provided only in one end of the blank. The embodiment is considered as advantageous in that the bulb made from the blank 40 is more securely attached to the shaft with a greater resistance to rotation and sliding movement.

Figure 10:
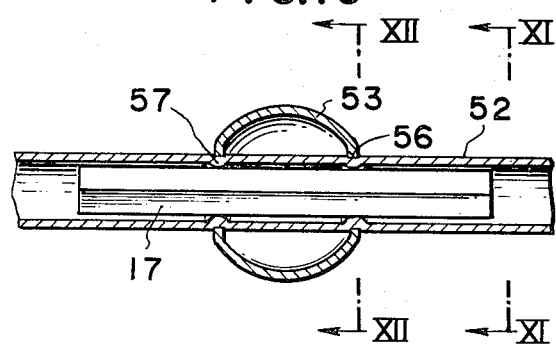
FIG. 10 is a sectional view similar to FIGS. 1 and 6 but showing a further embodiment of the present invention.

Referring now to FIGS. 10 through 12, there is shown a further embodiment of the present invention. In this embodiment, the shaft 52 has a reinforcement 17 inserted therein. As shown in FIGS. 11 and 12, the reinforcement is of a hexagonal cross-section of which diagonal dimension is close to the inner diameter of the shaft 52. The bulb 53 is similar in configuration to the bulb 3 of the embodiment shown in FIG. 1 and has diametrically aligned holes 56 for receiving the shaft 52. As in the previous embodiments, the edges of the holes 56 bite into the shaft 52 producing deformations 57 in the shaft 52. Since the reinforcement 17 extends beyond the distance between the holes 56, the shaft 52 is forced firmly against the reinforcement 17 and the deformations 57 have hexagonal cross-sections as shown in FIG. 12. The reinforcement 17 serves to reinforce the shaft 52 which may otherwise be weakened at the deformations 57. Further, it also serves to hold the bulb 53 against rotation.

FIG. 13 shows a modification of the embodiment shown in FIG. 1. In this modification, the shaft 2 is formed with an aperture 18 which connects the inside space of the bulb 3 with the interior of the shaft 2. The aperture 18 serves to prevent any pressure increase in the bulb 3 which may otherwise be encountered when the bulb is subjected to a high temperature for example in painting process. Without the aperture 18, air or oil trapped in the bulb 3 may be blown out through fine clearances between the shaft 2 and the edges of the holes 6 in the bulb 3 when the bulb 3 is subjected to a high temperature during the painting process to thereby cause painting defects and loosening of the bulb 3.

Referring to FIG. 14, there is shown an example wherein the shaft structure 1 of the present invention is used as a support strut for an automobile mirror 19. The mirror 19 is formed at the back wall with a receptacle 21 to which the bulb 3 of the shaft structure 1 is fitted to support the mirror 19 for rotation. In FIG. 15, there is shown an example wherein the shaft structure of the present invention is applied to a transmission gear shifting mechanism. The shaft 2 is supported pivotably at the bulb 3 by a receptacle 60 provided on a supporting bracket 61 which is located under a floor panel 62. The lower end of the shaft 2 is connected with a transmission gear control rod 63. The bulb 3 and the receptacle 60 are covered by a dust cover 64 provided on the floor panel 62.

The invention has thus been shown and described with reference to specific embodiments, however, it should be noted that the invention is in no way limited to the details of the illustrated structures but changes and modifications may be made without departing from the scope of the appended claims. For example, in the embodiment described above, both of the opposed dies are advanced but only one of them may be moved to effect the forming process.

We claim:

1. A method for manufacturing a shaft structure comprising a shaft having a spherical bulb secured to the shaft, said method comprising steps of providing a hollow cylindrical blank, inserting the shaft through the blank in concentrically spaced relationship therewith, and forming the blank into a substantially spherical bulb while simultaneously swaging the ends of the blank around the shaft so that the shaft is locally deformed by edges of the ends of the blank and the edges of the ends of the blank bite into the shaft to thereby secure the spherical bulb firmly to the shaft.

2. A method for manufacturing a shaft structure comprising a shaft having a spherical bulb secured thereto, said method comprising steps of providing a hollow cylindrical blank, inserting the shaft through the blank, holding the blank coaxially with and concentrically spaced from the shaft by holding means, applying a pair of forming dies to the ends of the blank so that the blank is held by the dies, releasing the holding means and forming the blank by the forming dies into a substantially spherical bulb while simultaneously swaging the ends of the blank around the shaft so that the shaft is locally deformed by edges of the blank and the edges of the blank bite into the shaft to thereby secure the spherical bulb firmly to the shaft.

3. A method for manufacturing a shaft structure comprising a shaft having a spherical bulb secured thereto, said method comprising steps of providing a hollow shaft, inserting a reinforcement rod into the shaft, providing a hollow cylindrical blank, inserting the shaft through the blank, holding the blank coaxially with and concentrically spaced from the shaft by holding means, applying a pair of forming dies to the ends of the blank so that the blank is held by the dies, releasing the holding means and forming the blank by the forming dies into a substantially spherical bulb while simultaneously swaging the ends of the blank around the shaft so that the shaft is locally deformed by edges of the blank and the edges of the blank bite into the shaft to thereby secure the spherical bulb firmly to the shaft.

* * * * *